United States Patent [19]
Liao

[11] Patent Number: 6,149,388
[45] Date of Patent: Nov. 21, 2000

[54] COMBINATION OF A BLADE BRACKET AND A COLLAR OF A CEILING FAN

[76] Inventor: Ming Hang Liao, No. 11, Lane 94, Tong-Shin Rd., Shi-Tune District, Taichung, Taiwan

[21] Appl. No.: 09/378,790

[22] Filed: Aug. 23, 1999

[51] Int. Cl.[7] .................................................. F04D 29/34
[52] U.S. Cl. ........................ 416/210 R; 416/5; 416/206; 416/220 A; 416/221; 403/319; 403/381
[58] Field of Search .................................. 416/5, 210 R, 416/206, 207, 208, 214 R, 220 A, 221; 403/319, 329, 381

[56] References Cited

U.S. PATENT DOCUMENTS

| | | | |
|---|---|---|---|
| 5,372,480 | 12/1994 | Van Meter et al. | 416/214 R |
| 5,927,945 | 7/1999 | Chen | 416/5 |
| 5,951,197 | 9/1999 | Wu | 416/206 |
| 5,980,353 | 11/1999 | Wu | 416/210 R |
| 6,059,531 | 5/2000 | Tai | 416/220 A |

Primary Examiner—Christopher Verdier
Attorney, Agent, or Firm—Alan Kamrath

[57] ABSTRACT

A collar of a ceiling fan is composed of a plurality of sectors and each sector has a protrusion extending from a top thereof and a recess defined in an outside thereof. A resilient member is connected to each sector and includes a first portion having an aperture for receiving the protrusion, and a second portion which is a triangular member including two inclined sides. The resilient member is engaged with the recess of the sector corresponding thereto. The blade bracket has an end block which is engaged with the recess corresponding thereto and compressed by one of the inclined sides of the resilient member.

4 Claims, 10 Drawing Sheets

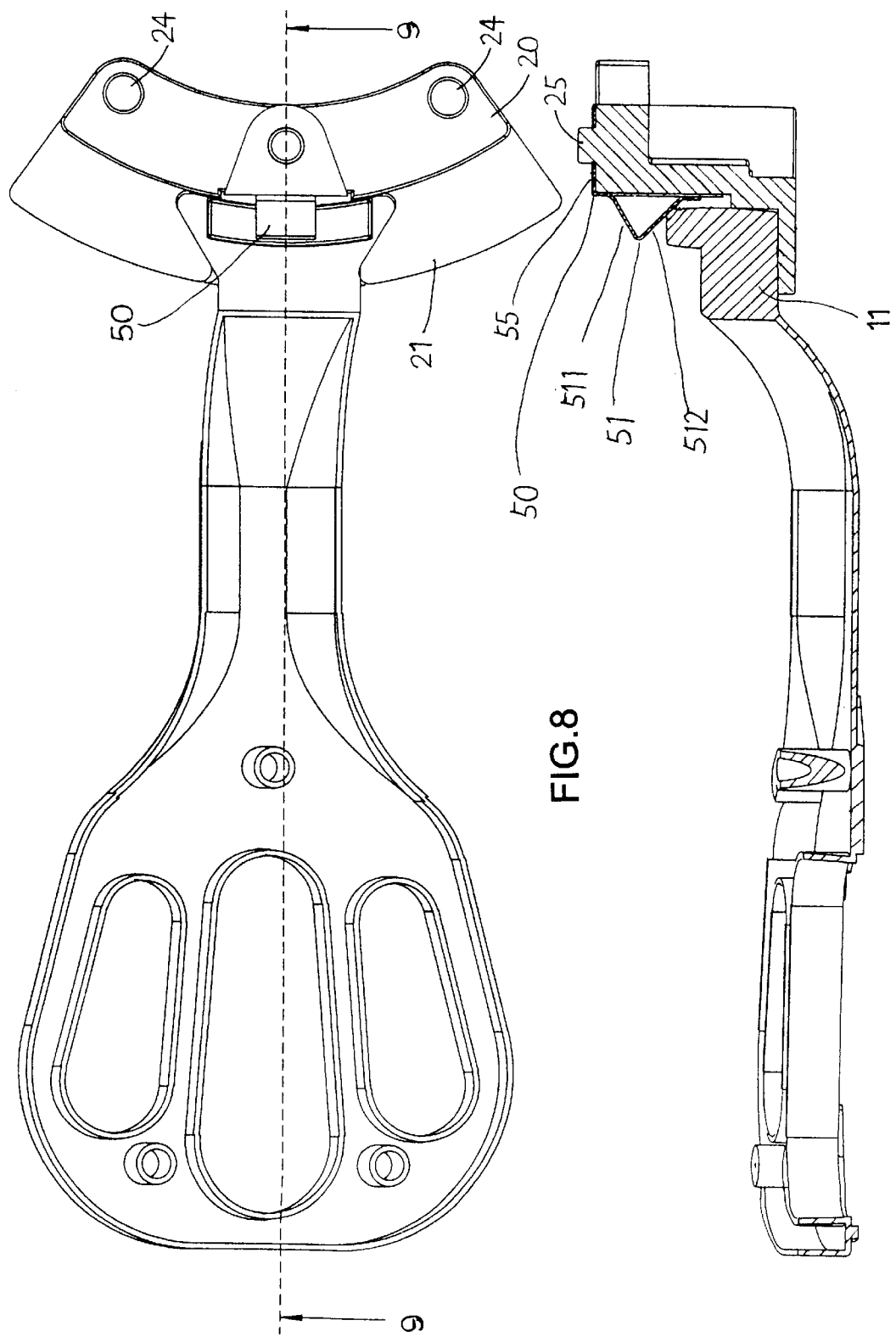

6,149,388

COMBINATION OF A BLADE BRACKET AND A COLLAR OF A CEILING FAN

FIELD OF THE INVENTION

The present invention relates to the combination of a ceiling fan blade bracket and the collar to which a plurality of blade brackets are connected. The collar has a plurality of triangular resilient members so as to urge an end block on the blade brackets.

BACKGROUND OF THE INVENTION

A conventional connection of a ceiling fan blade bracket 10' and a collar 20' is shown in FIGS. 1 to 6, each blade bracket 10' is connected to a blade 40 at one end of the bracket 10' and the other end of the bracket 10' has an end block 11' having a recess 110 defined in the bottom thereof. The collar 20' has a plurality of protrusions extending radially inward from an inside thereof and each protrusion has a hole 24' defined therethrough so that the collar 20' is connected to the motor 30 by extending bolts 31 through the holes 24' and engaged with the threaded holes 32 defined in the motor 30 as shown in FIG. 6. The motor 30 is enclosed by a motor casing composed of two halves 301, 302. A plurality of engaging notches 22' are defined in the upper surface of the collar 20' and a rod 23' extends from each bottom defining the notch 22'. The rod 23' is to be received in the notch 110 of the end block 11' of each bracket 10' such that the brackets 10' are connected to the collar 20'.

Nevertheless, the connection of the bracket 10' and the collar 20' is not secured enough because when the ceiling fan is turned on, the blades 40 will rotate and the end blocks 11' could lift slightly and could disengage from the rod 23'. Furthermore, the whole collar 20' is a one-piece member and the mold to make the protrusions extending from the inside is expensive. It is difficult to maintain the size precisely because the collar 20' is a large piece so that the positions of the protrusions could not align with the positions of the threaded holes 32 defined in the motor 30.

The present invention intends to provide a combination of a collar and a blade bracket of a ceiling fan wherein the collar is composed of a plurality of sectors and each has a resilient member connected to the outside thereof and the blade bracket has an end block which is received in an engaging notch and urged by the resilient member. The present invention mitigates the disadvantages of the conventional fan blade bracket and the collar of a ceiling fan.

SUMMARY OF THE INVENTION

In accordance with one aspect of the present invention, a combination of a ceiling fan blade bracket and a collar is provided wherein the collar comprises a plurality of sectors and each of which has a protrusion extending from a top thereof and a recess defined in an outside of each sector. A resilient member is connected to each sector and has a first portion through which an aperture is defined for receiving the protrusion, and a second portion which is a triangular member including two inclined sides. The resilient member is engaged with the recess. The blade bracket has an end block connected to one of two ends thereof and the end block is engaged with the recess of the sector corresponding thereto. The end block is compressed by one of the inclined sides.

The main object of the present invention is to provide a combination of a ceiling fan blade bracket and a collar, wherein the collar is composed of a plurality of sectors so that the mold manufacturing the sectors is small and cheap.

Another object of the present invention is to provide a combination of a ceiling fan blade bracket and a collar, wherein each sector has a resilient member for urging an end member of the bracket.

Further objects, advantages, and features of the present invention will become apparent from the following detailed description with appropriate reference to the accompanying drawings.

BRIEF DESCRIPTION OF THE DRAWINGS

FIG. 8 is a plan view to show the combination of the sector of the collar and the blade bracket of the present invention;

FIG. 9 is a side elevational view, partly in section, of the combination of the sector of the collar and the blade bracket;

DETAILED DESCRIPTION OF THE PREFERRED EMBODIMENTS

Figure 12:
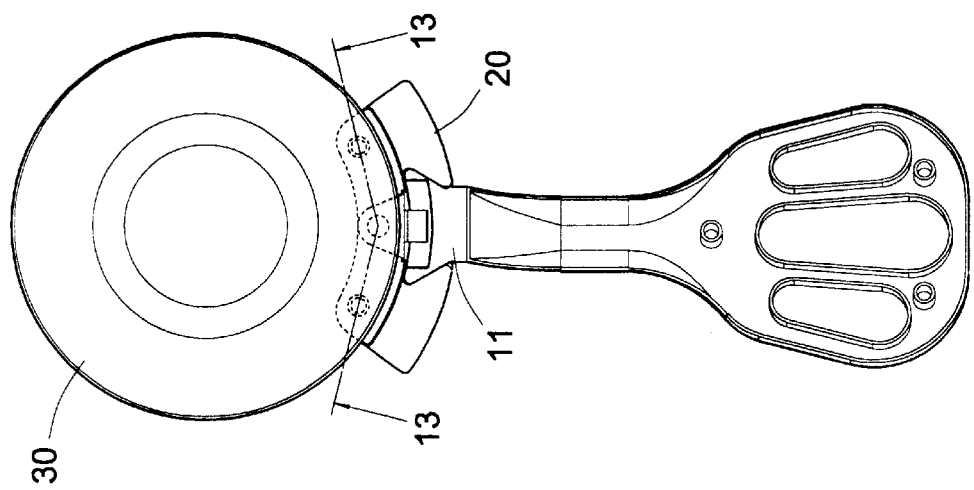
FIG. 12 is a plan view to show the connection of the sector and the motor of the present invention.
Figure 13:
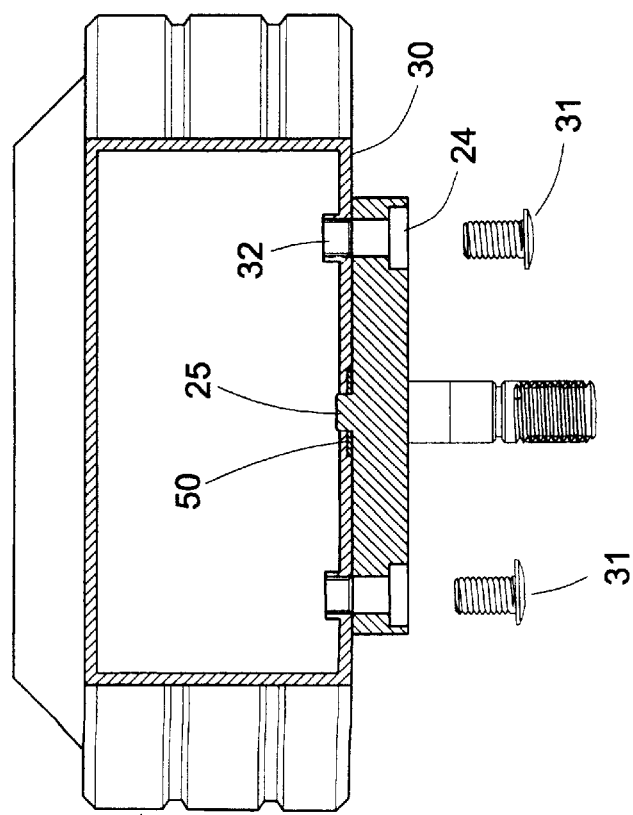
FIG. 13 is a cross-sectional view to show the connection of the sector and the motor of the present invention.

Referring to FIGS. 7 to 10, the collar of the ceiling fan of the present invention is composed of a plurality of sectors 20 which are connected with each other to be a circular member wherein each sector 20 has a first step portion 210 and a second step portion 21 which extends radially outward from the first step portion 210. A protrusion 25 extends from a top of the first step portion 210 and two holes 24 are defined through the first step portion 210 so that the sector can connected to the motor 30 by extending bolts through the holes 24 and engaged with the threaded holes 32 as shown in FIGS. 12 and 13. The first step portion 210 has a dent portion 26 defined in an outside thereof and the second step portion 21 has a recess 22 defined in the outside thereof.

Each of the sectors has a resilient member 50 connected thereto and the resilient member 50 has a first portion 55 through which an aperture 54 is defined. A second portion 51 extends from the first portion 55 and is a triangular member which includes two inclined sides 511, 512. A third portion 52 extends perpendicularly from the first portion 55 and the third portion 52 is located between the triangular section portion 51 and the first portion 55. The third portion 52 is fixedly engaged with the dent portion 26. The resilient member 50 engaged with the recess 22 of the second step portion 21 and the first portion 55 is engaged with the top of the first step portion 210. The protrusion 25 of the sector 21 is received in the aperture 54 in the first portion 55 of the resilient member 50 and in turn received in the positioning hole 33 in the motor 30 (see FIGS. 12 and 13) so that the collar is easily connected to the motor 30 by inserting the protrusions 25 in the positioning holes 33 of the motor 30.

The blade bracket 10 of the ceiling fan has an end block 11 connected to one of two ends thereof and the blade (not shown) is connected to the other end of the bracket 10. The end block 11 is engaged with the recess 22 of the sector 21 corresponding thereto and compressed by the inclined side 512 of the resilient member 50.

Figure 1:
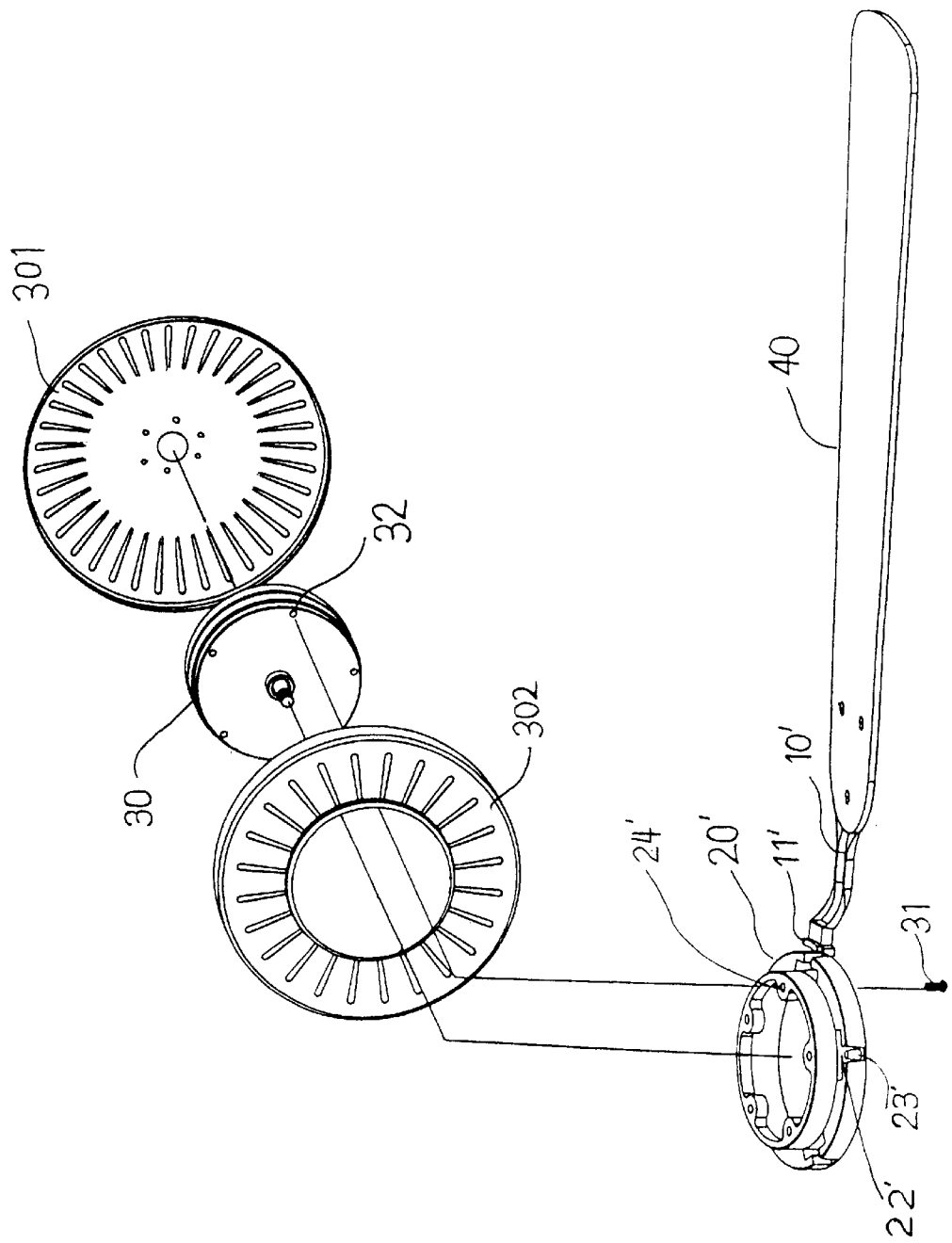
FIG. 1 is an exploded view of a conventional ceiling fan blade bracket, a collar and the motor.
Figure 2:
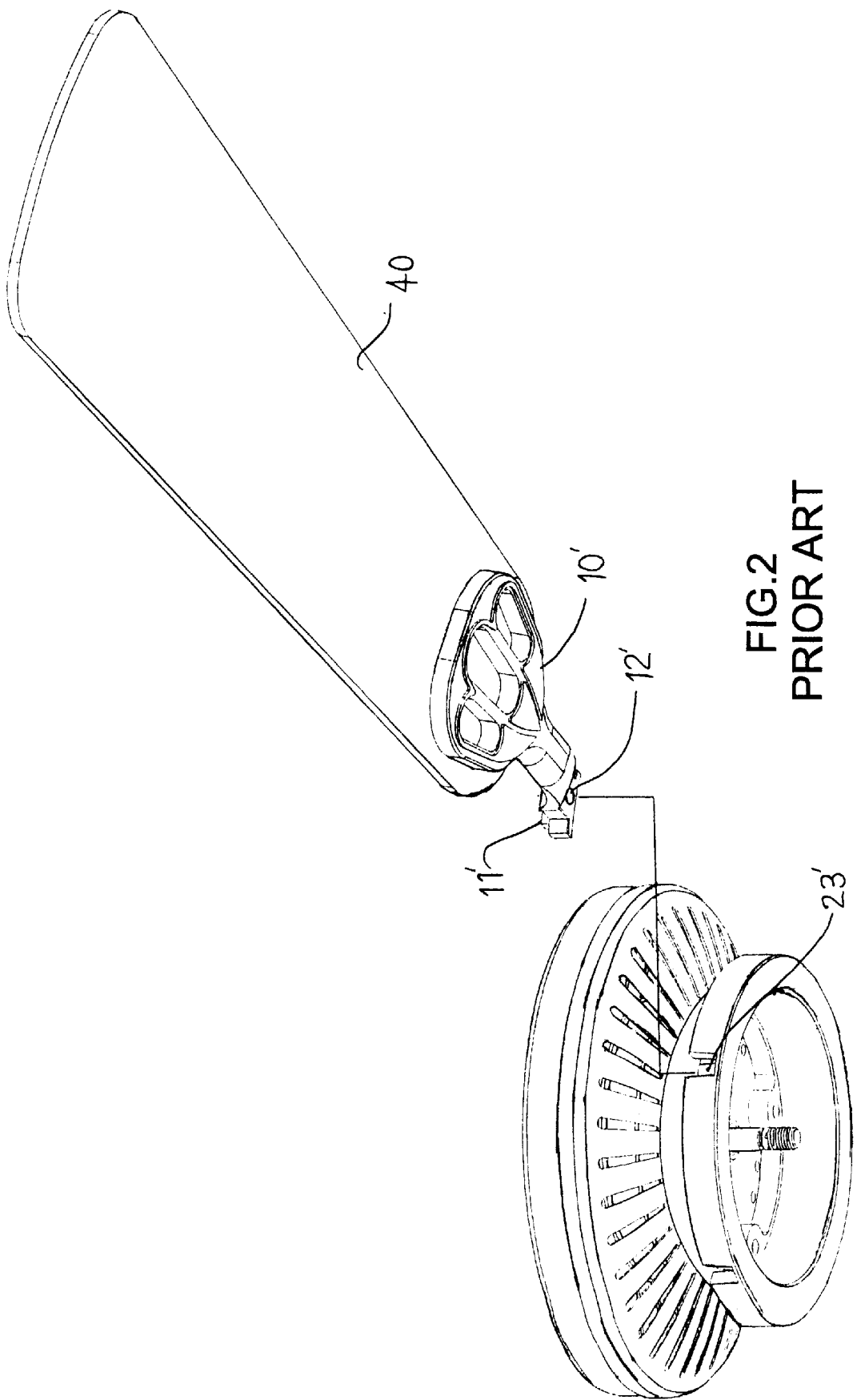
FIG. 2 is an exploded view of the conventional ceiling fan blade bracket and the conventional collar.
Figure 3:
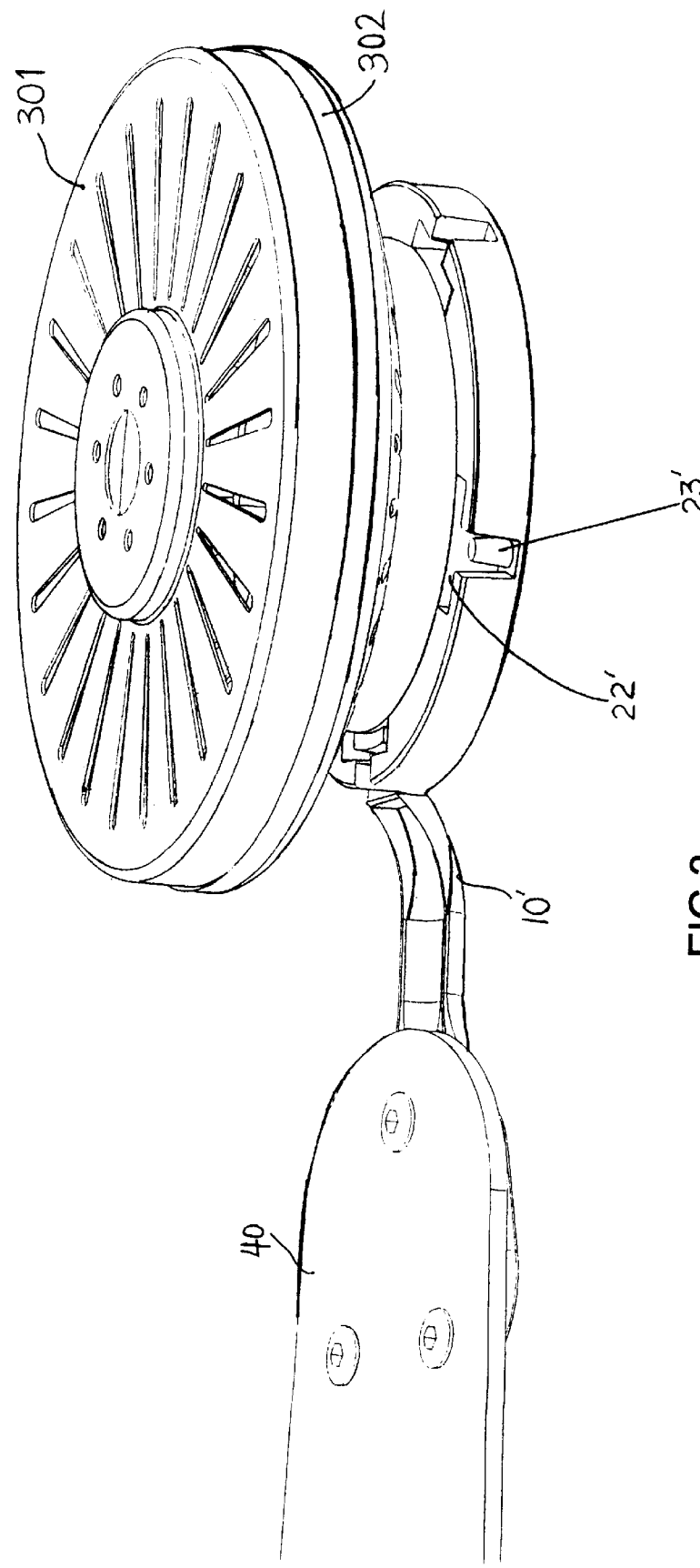
FIG. 3 is a perspective view of the combination of the conventional collar, conventional blade bracket and the motor.
Figure 4:
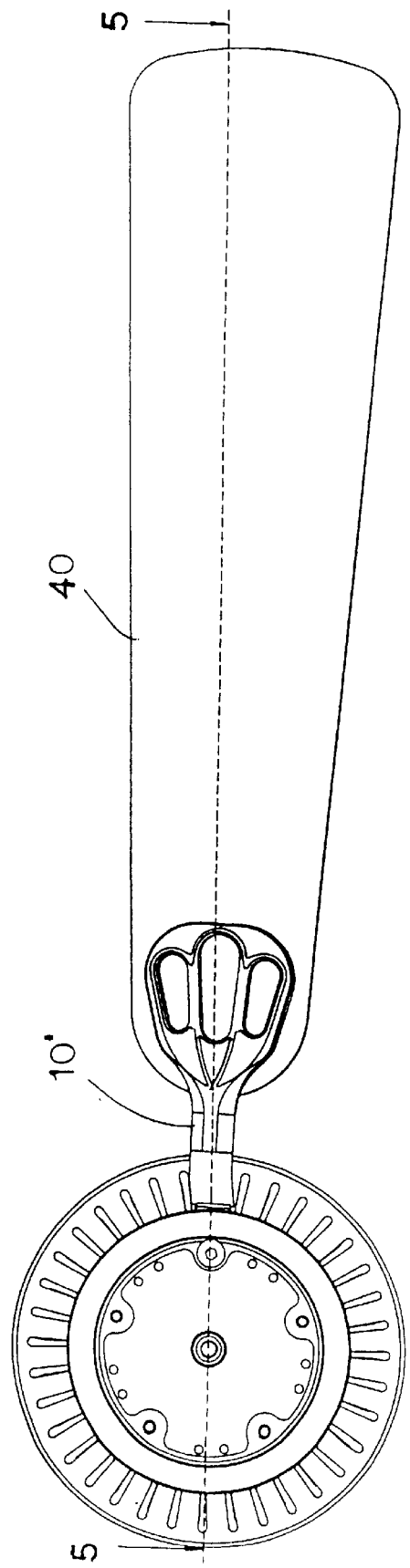
FIG. 4 is a plan view to show the combination of the conventional collar and the conventional blade bracket.
Figure 5:
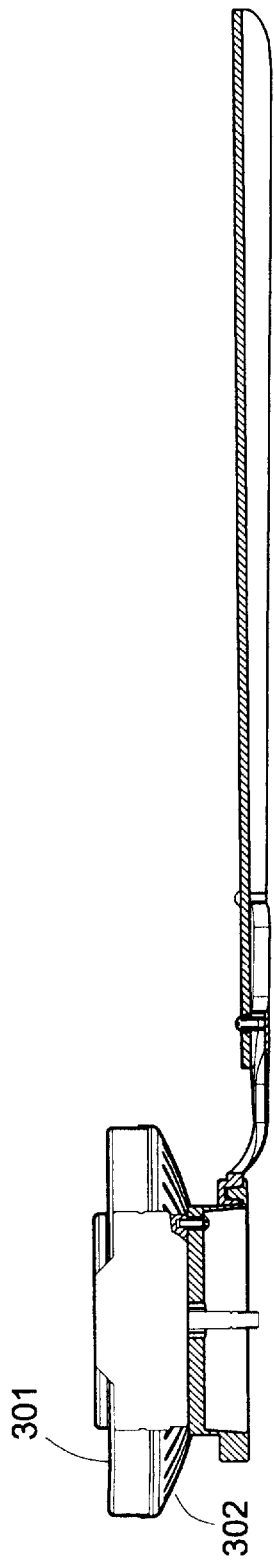
FIG. 5 is a side elevational view, partly in section, of the combination of the conventional collar and the conventional blade bracket.
Figure 6:
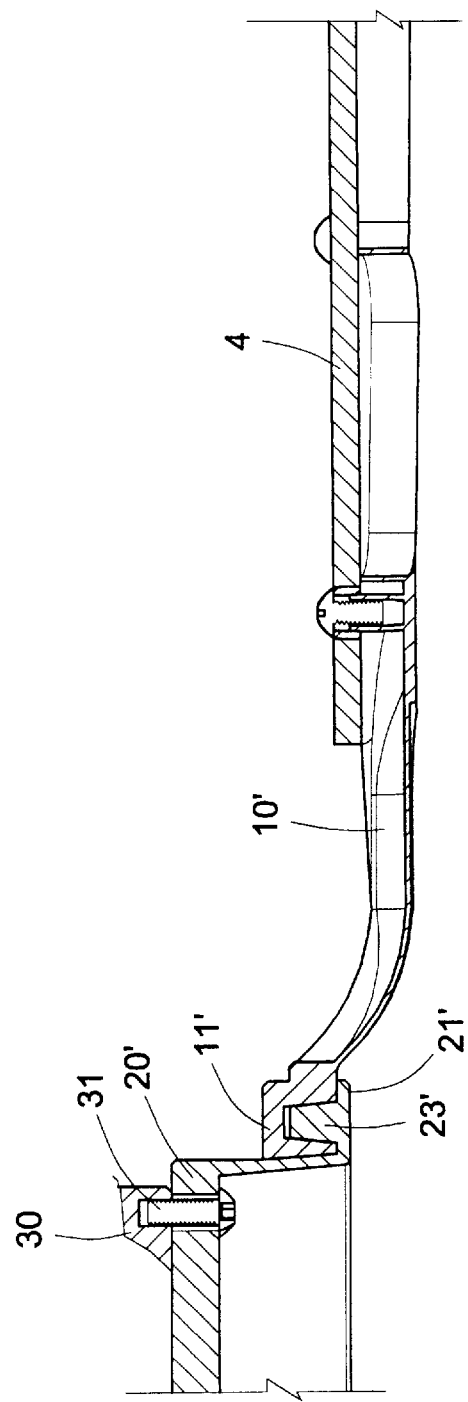
FIG. 6 is an enlarged side elevational view, partly in section, of the combination as shown in FIG. 5.
Figure 7:
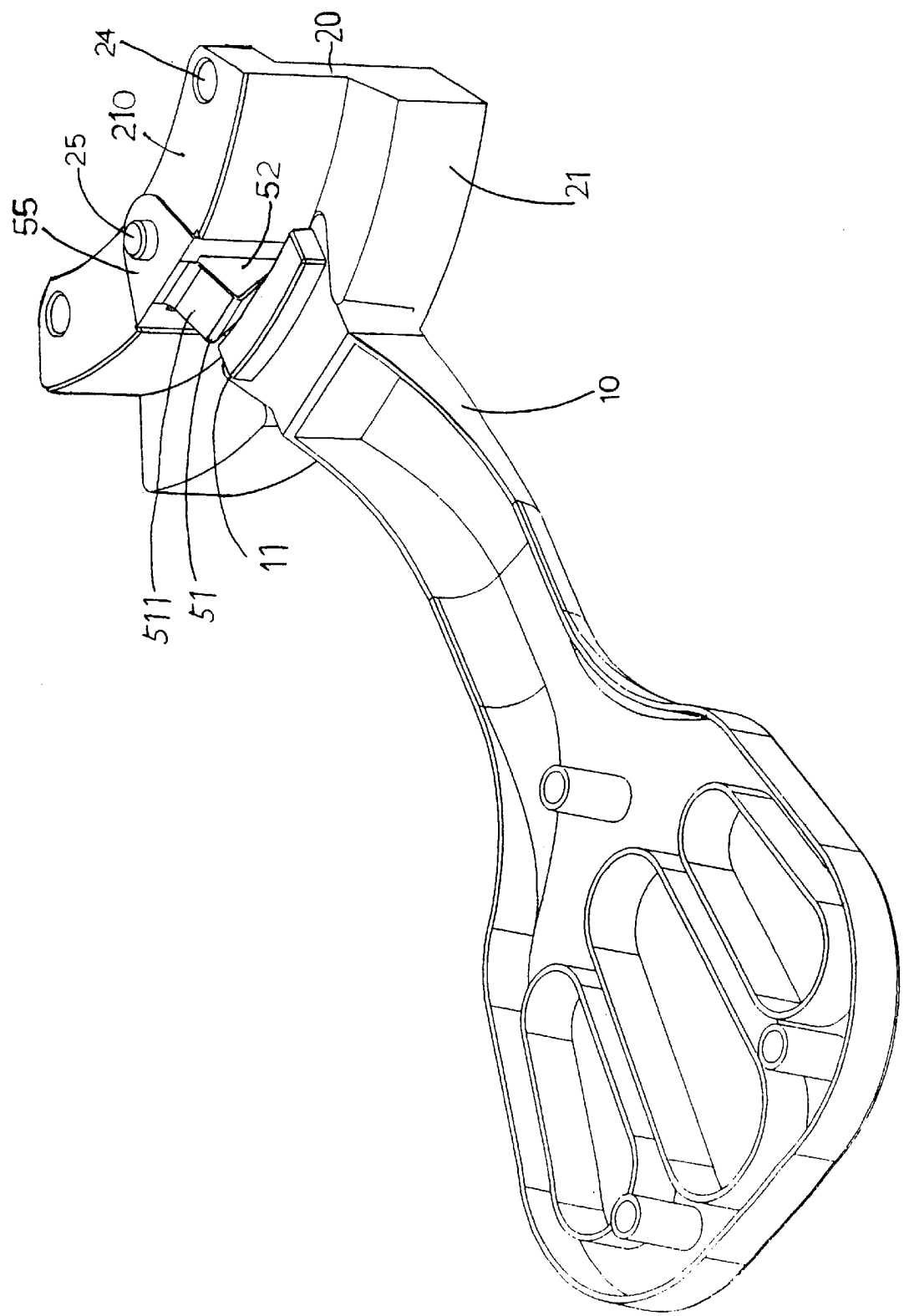
FIG. 7 is a perspective view of the combination of a sector of the collar and a blade bracket in accordance with the present invention.
Figure 10:
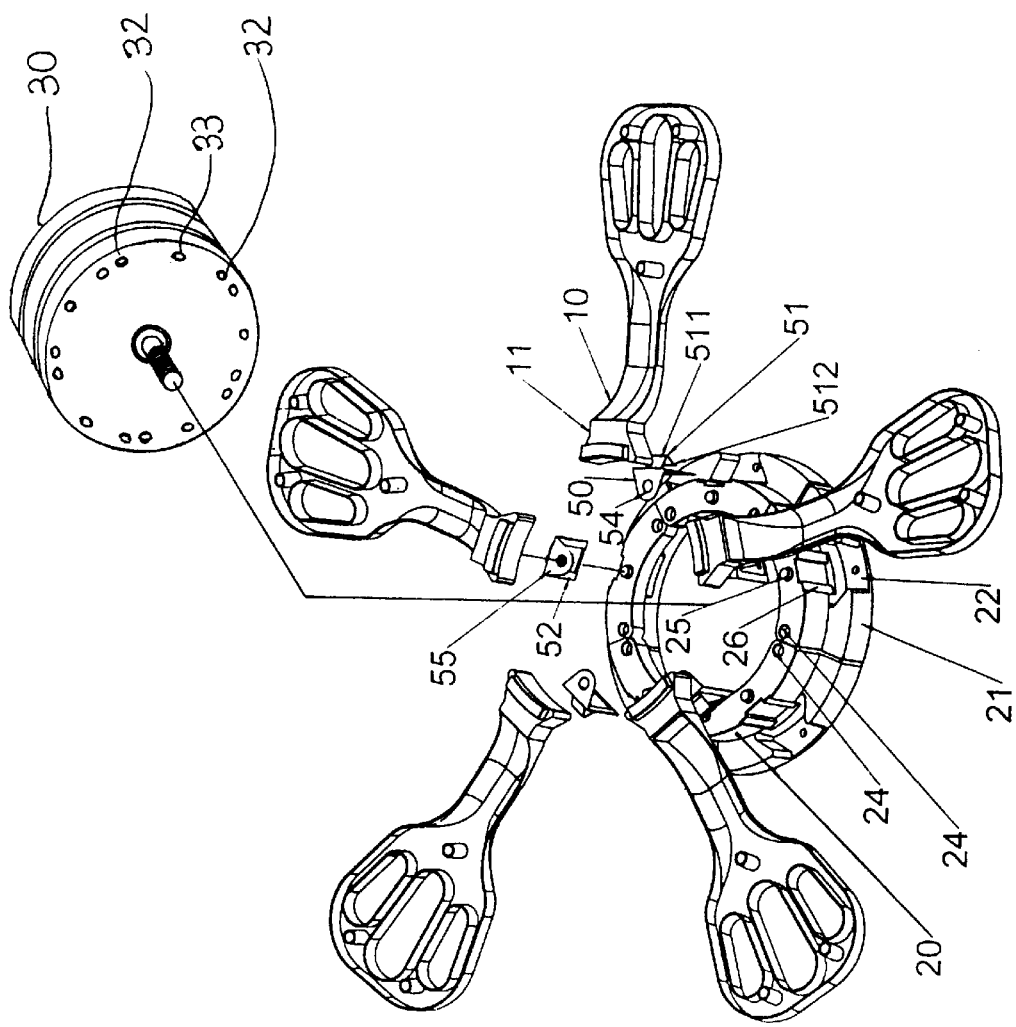
FIG. 10 is an exploded view to show the collar, the blade brackets and the motor of the present invention.
Figure 11:
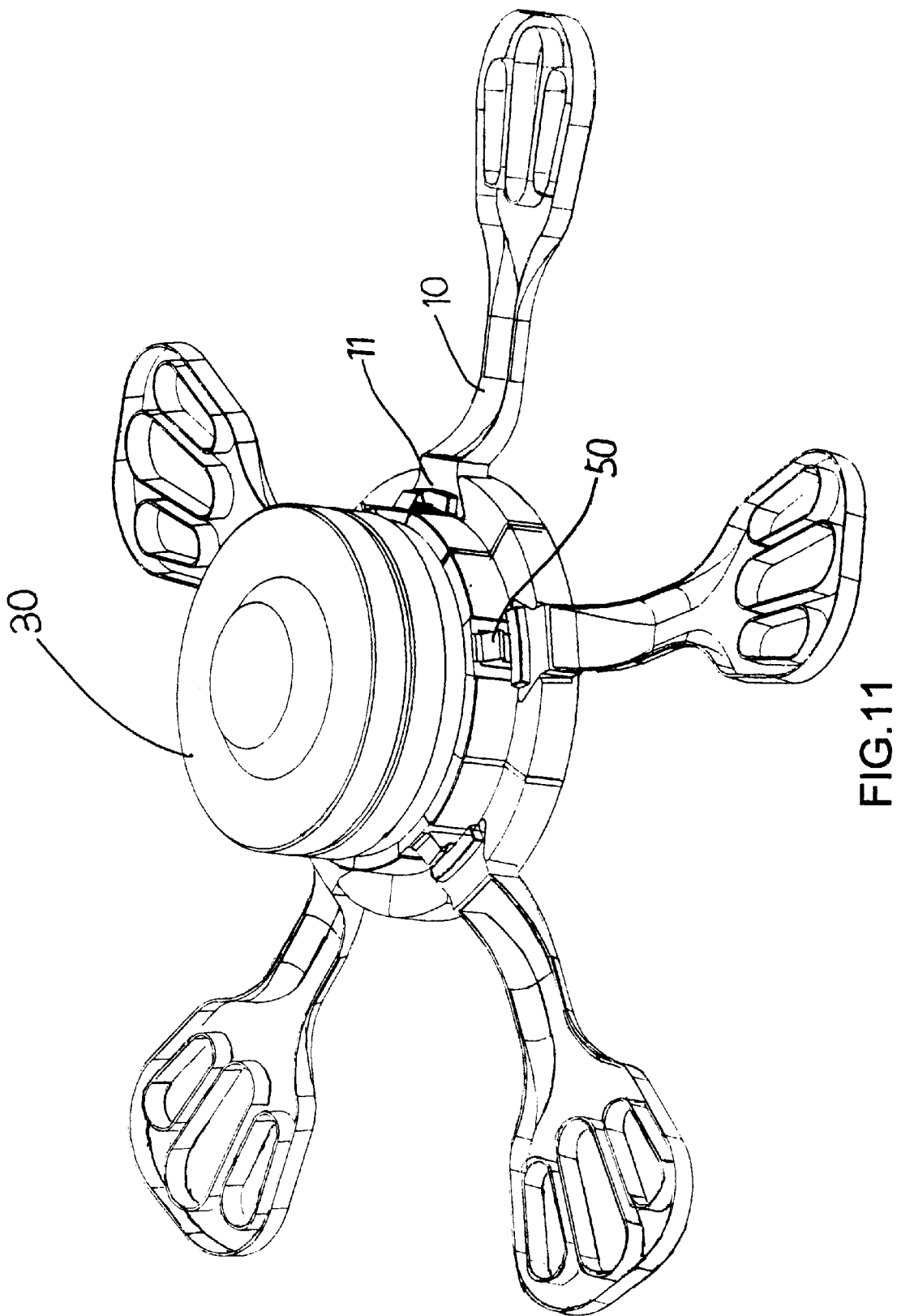
FIG. 11 is a perspective view to show the combination of the collar, the blade brackets and the motor of the present invention.

As shown in FIG. 11, the connection of the blade brackets 10 and the collar is simple, the assemblers directly insert the end blocks 11 of the brackets 10 into the recesses 22 and the end blocks 11 are respectively positioned by the resilient members 50. The first portion 55 of the resilient member 50 is securely clamped between the motor 30 and the collar so that the resilient member 50 is securely positioned and the end blocks 11 are compressed by the resilient members 50 so that the brackets 10 are secured to the collar.

The invention is not limited to the above embodiment but various modifications thereof may be made. It will be understood by those skilled in the art that various changes in form and detail may made without departing from the scope and spirit of the present invention.

What is claimed is:

1. A combination of a ceiling fan blade bracket and a collar, said collar comprising a plurality of sectors and each sector having a protrusion extending from one of two sides thereof and a recess defined in an outside of said sector;

each sector having a resilient member connected thereto, said resilient member having a first portion through which an aperture is defined, and a second portion which is a triangular member including two inclined sides, said resilient member engaged with said recess of said sector corresponding thereto and said protrusion of said sector received in said aperture, and said blade bracket having an end block connected to one of two ends thereof and said end block engaged with said recess of said sector corresponding thereto, said end block being compressed by one of said inclined sides.

2. The combination as claimed in claim 1, wherein each sector of said collar has a first step portion and a second step portion which extends radially outward from said first step portion, said protrusion extending from a top of said first step portion.

3. The combination as claimed in claim 2, wherein said first step portion has a dent portion defined in an outside thereof and said resilient member includes a third portion which extends perpendicularly from said first portion, said triangular section portion extending from said third portion which is fixedly engaged with said dent portion.

4. The combination as claimed in claim 2, wherein said recess is defined in said second step portion.

* * * * *